(12) United States Patent
Taniguchi et al.

(10) Patent No.: US 6,331,248 B1
(45) Date of Patent: Dec. 18, 2001

(54) HOLLOW FIBER MEMBRANE MODULE

(75) Inventors: Tohru Taniguchi; Nobuhiko Suga, both of Fuji (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 09/043,963

(22) Filed: Mar. 20, 1998

(30) Foreign Application Priority Data

Sep. 21, 1995 (JP) .................................................. 7-242758
Nov. 13, 1995 (JP) .................................................. 7-294002

(51) Int. Cl.$^7$ .................................................. B01D 63/02
(52) U.S. Cl. .................................. 210/321.8; 210/321.9; 210/321.81; 210/232; 210/450; 210/500.23
(58) Field of Search ........................ 210/321.78, 321.79, 210/321.8, 321.87, 321.89, 321.81, 321.9, 232, 450, 500.23

(56) References Cited

U.S. PATENT DOCUMENTS

| 4,898,670 | 2/1990 | Gollan . | |
|---|---|---|---|
| 5,169,530 | * 12/1992 | Schucker et al. | 210/321.9 |
| 5,472,601 | 12/1995 | Eguchi . | |
| 5,578,267 | * 11/1996 | Cosentino et al. | 210/321.79 |
| 5,622,857 | * 4/1997 | Goffe | 210/321.8 |

FOREIGN PATENT DOCUMENTS

| A10408000 | 1/1991 | (EP) . |
|---|---|---|
| A1 2699424 | 6/1994 | (FR) . |
| 50-73882 | 6/1975 | (JP) . |
| U58-53202 | 4/1983 | (JP) . |
| U58-95202 | 6/1983 | (JP) . |
| A60-110390 | 6/1985 | (JP) . |
| A61-157309 | 7/1986 | (JP) . |
| A63-99310 | 4/1988 | (JP) . |
| A63-171606 | 7/1988 | (JP) . |
| A63-171607 | 7/1988 | (JP) . |
| (A) 64-90005 | 4/1989 | (JP) . |
| A3-131324 | 6/1991 | (JP) . |
| A3-165818 | 7/1991 | (JP) . |
| 3A-249927 | 11/1991 | (JP) . |
| A4-108518 | 4/1992 | (JP) . |
| A4-322730 | 11/1992 | (JP) . |
| (A) 6-226058 | 8/1994 | (JP) . |
| (A) 6-296834 | 10/1994 | (JP) . |
| (A) 6-296836 | 10/1994 | (JP) . |
| (A) 7-265671 | 10/1995 | (JP) . |
| A7-265671 | 10/1995 | (JP) . |

OTHER PUBLICATIONS

Japanese Abstract, Publication No. (A) 6–023243, Publication Date Feb. 1, 1994.

\* cited by examiner

*Primary Examiner*—Ana Fortuna
(74) *Attorney, Agent, or Firm*—Birch, Stewart, Kolasch & Birch, LLP

(57) ABSTRACT

A hollow fiber membrane module comprising a module case and a hollow fiber membrane bundle comprising a plurality of hollow fiber membranes, at least one end of the bundle being bonded to and fixed on the module case, wherein the bonding portions of the hollow fiber membrane bundle and the module case comprise a silicone type resin and in at least one of the bonding portions, a reinforcing rib for reinforcing the bonding portions is directly fixed on the module case. According to the hollow fiber membrane module of this invention, the membrane filtration treatment of water containing ozone over a long period of time and the repeating washing with water containing ozone are made possible.

17 Claims, 5 Drawing Sheets

HOLLOW FIBER MEMBRANE MODULE

This application is the national phase under 35 U.S.C. §371 of prior PCT International Application No., PCT/JP96/02699, which has an International filing date of Sep. 19, 1996, which designated the United States of America, the entire contents of which are hereby incorporated by reference.

TECHNICAL FIELD

This invention relates to a hollow fiber membrane module suitable for uses such as filtration of a large amount of water containing ozone in various water treatments such as a water treatment for obtaining tap water from river water, lake water or ground water, a treatment of sea water or waste water and the like.

BACKGROUND ART

In the purification of river water, lake water, sea water, industrial waste water or the like, the turbidity material in water has heretofore been agglomerated with a flocculant such as polyaluminum chloride or the like to form flocks. A method of purifying water by adding a flocculant (flocculation method) is described in detail in, for example, "Josui no Gijutsu" (Technique of Water Purification) by Kenji TANBO and Koichi OGASAWARA published by Gihodo (1985), Chapter 2. However, in the case of such a method, when the quality of raw water such as river water, ground water, waste water or the like is fluctuated, it is necessary to optimize the amount of a flocculant added, pH and the like corresponding to the fluctuation in order to carry out an effective treatment, and a preliminary test such as a so-called jar test is required. In the conventional water-purification method, not only is the operation thus complicated, but also large scale equipment such as a flocks-forming pond, a settling pond, sand-filtration equipment or the like has been required.

In order to overcome the above-mentioned defects which the flocculation method has and to obtain the stabilized water quality by compact equipment without being greatly affected by the fluctuation of the quality of the raw water, a new process for treating water using a membrane has been proposed.

It is difficult to employ membranes alone in industrial uses. However, from the viewpoint that the use of a membrane enables one to ensure a high treatment capacity per unit volume at a low cost, a hollow fiber membrane made of a polymer has been put to practical use as a membrane module. The hollow fiber membrane module can be constructed by receiving such a hollow fiber membrane into a module case, bonding and fixing at least one end of the membrane with a thermo-setting resin such as an epoxy resin, a urethane resin or the like, thereafter cutting the unnecessary bonding portion, and opening the hollow portion of the fiber.

However, when the above-mentioned membrane module is used, there has been such a problem that the permeation flow velocity of the treating water is decreased with the lapse of time (New Membrane Technology Symposium '92 held by the Membrane Society of Japan and the Japan Management Association, Preprint SESSION 3, 1992).

For solving these problems, there has recently been proposed a method of inhibiting the decrease of permeation flow velocity of the treating water with the lapse of time by previously treating the raw water with ozone [Jour. American Water Works Association (AWWA), 77 (60–65) (1985)]; a method of inhibiting the clogging of a filtration membrane by injecting ozone into the raw water before membrane filtration and then filtering the raw water containing ozone (JP-A-4-108518); an oil-water separator in which ozone or hydrogen peroxide is fed before membrane filtration in separating an oil and water from waste water containing the oil (JP-A-63-93310); a method of recovering the decreased permeation flow velocity by use of water containing ozone when a separating membrane is washed (JP-A-3-249927); or the like.

Such an ozone treatment is particularly effective when the clogging of a membrane results from an organic material; however, a membrane module capable of resisting the strong oxidative action of ozone is required. For example, when water containing ozone is filtered using an organic hollow fiber membrane, the membrane constituting the membrane module, the module case portion and the bonding portion must have not only the respective functions as the respective constructive materials, but also ozone resistance in at least portions contacting an ozone gas or water containing ozone. In addition, from the industrial viewpoint of the life of the membrane module, ozone resistance of at least one-half year, preferably 1 to 3 years is required.

As a membrane module having ozone resistance, there have heretofore been known, for example, inorganic membrane modules using a ceramic membrane, ALL-PVDF Ultrastack™ using the flat membrane-like ultrafiltration membrane made of a polyvinylidene fluoride (PVDF) stated in ULTRAPURE WATER, 7 (6), 32–36, 38–40 (1990), and the like. However, the module using a ceramic membrane is expensive and has such a problem that there is a limit in the compactification of equipment. Also, in the membrane-filtration system using ALL-PVDF Ultrastack™, the compactification of equipment is difficult and, in addition, when it is intended to adopt a cross flow filtration system which is excellent in respect of stably maintaining the permeation flow velocity, there is a problem that said application is difficult.

Furthermore, when the raw water contains inorganic materials such as sand and clay, even if an ozone treatment is effected, there are such problems that inorganic materials accumulate on the membrane surface and the permeation flow velocity is decreased with the lapse of time. For solving these problems, JP-A-7-265671 discloses an external pressure cross flow filtration which can make it difficult for materials causing clogging to pile up on the membrane surface and can make the membrane surface area large, and an external pressure system membrane module capable of discharging the suspended materials which have piled up between the hollow fiber membranes by routine aeration-flushing (stated as an air-bubbling). However, these membrane modules use a silicone rubber as an adhesive for bonding and fixing the membrane used on the module case, and hence, they lack strength and are inconvenient in conducting a stable filtration on a commercial scale over a long period of time though they can be applied to a short time use or to a use in a small module diameter. Therefore, a development of a more improved membrane module has been strongly desired.

DISCLOSURE OF THE INVENTION

This invention aims at providing a hollow fiber membrane module which is little deteriorated by the strong oxidizing power possessed by ozone when a large amount of water is subjected to filtration treatment using an organic hollow fiber membrane, on which membrane the piling of materials suspended in the water is hardly caused, which membrane can be used in a stable water treatment over a long period of time, and in which membrane the adhesive for bonding and fixing the hollow fiber membrane to the module case is excellent in compressive strength.

The present inventors have made extensive research and have consequently found that the above-mentioned object can be achieved by the membrane module of this invention.

This invention relates to a hollow fiber membrane module which comprises a module case and a hollow fiber membrane bundle comprising a plurality of hollow fiber membranes, at least one end of the bundle being bonded to and fixed on the module case, wherein the bonding portions of the hollow fiber membrane bundle and the module case comprise a silicone type resin and in at least one of the bonding portions, a reinforcing rib for reinforcing the bonding portion is directly fixed on the module case.

Also, the following are mentioned as preferable modes of this invention:

(1) The reinforcing rib is fixed on the module case by at least one means selected from the group consisting of screwing, combination with a notch portion provided in the module case, fusion and welding, or the reinforcing rib is integrally molded with the module case.

(2) The cross-section of the reinforcing rib perpendicular to the longitudinal direction of the hollow fiber membrane module has a radial shape, a lattice shape or a combined shape of radial shape and concentric shape.

(3) The reinforcing rib is one flat plate or a combination of plural flat plates arranged in parallel to the longitudinal direction of the hollow fiber membrane module and has a plurality of perforated holes on said flat plate.

(4) The whole of the reinforcing rib is embedded in the bonding portion.

(5) The module case and the reinforcing rib are composed of any one of stainless steel, fluorine type resin and chlorine type resin or a combination thereof.

(6) The hollow fiber membrane is composed of a fluorine type resin.

(7) The bonding portion of the hollow fiber membrane and the module case is composed of a silicone type resin obtained by curing a liquid silicone rubber.

(8) The bonding portion of the hollow fiber membrane and the module case is a silicone type resin obtained by curing an addition type liquid silicone rubber, the viscosity before the curing is 10 mPa·sec to 250 Pa·sec, and the weight average molecular weight before the curing is in the range of from 5,000 to 300,000.

(9) The bonding portion of the hollow fiber membrane and the module case is a silicone type resin obtained by curing an addition type silicone rubber and the JIS-A hardness as measured by the measurement method of JIS K6301 after the curing is at least 30, and the tensile strength at break is at least 2 MPa.

BRIEF DESCRIPTION OF THE DRAWINGS

Each of FIGS. 3 to 7 is a cross-sectional view showing an example of the reinforcing rib of this invention.

BEST MODES FOR CARRYING OUT THE INVENTION

In a water treatment using the membrane module of this invention, the concentration of ozone added to the raw water is required to be adjusted to such an optimum value that the operation of filtration becomes stable, taking into consideration the concentration of organic materials and inorganic ions contained in the raw water, the energy cost for generating ozone and the like. Usually, such an ozone concentration is 0.01 to 20 ppm in terms of concentration in water.

When the ozone concentration is less than 0.01 ppm, though the ozone resistance of the membrane module is sufficient, the effect of ozone on inhibiting the decrease of the permeation velocity of the treating water with the lapse of time and on inhibiting the clogging is not sufficiently exerted and the primary object of ozone cannot be achieved. Also, it is insufficient for the purpose of planning to recover the decreased permeation flow velocity using water containing ozone during the wash and back wash.

On the other hand, when the ozone concentration exceeds 20 ppm, the treatment cost for the generation of ozone becomes so high that it is not practical. A higher ozone concentration is not necessary for the purpose and at a concentration higher than that, a further increased effect is not desired to be obtained by heightening the concentration. Rather, such problems are caused that the deterioration of devices such as the pump, piping and the like including the module is accelerated by the strong oxidative action of a high concentration of ozone and that the life of the devices is shortened. Considering these points, the ozone concentration range is preferably from 0.1 to 10 ppm, more preferably from 0.2 to 8 ppm. Herein described is a case where the hollow fiber membrane module of this invention is applied to a water treatment in the presence of ozone; however, this invention can, of course, be applied to cases where other reagents than ozone, for example, oxidizing agents such as sodium hypochlorite, hydrogen peroxide and the like, etc. co-exist in water.

In this invention, the water treatment means a tap water treatment, a reclaimed water treatment, a sewage water treatment, a sea water treatment and the like. More particularly, it means a tap water treatment for filtering river water, lake water or ground water as raw water to obtain tap water; a reclaimed water treatment for filtering water for building and miscellaneous water for general home; a sewage treatment for treating or regenerating waste water; a water treatment for producing industrial water; a sea water treatment for obtaining cooling water, desalted water or sea water for salt-producing electrodialysis by filtering sea water; and the like. This invention is particularly suitable to filtration of surface water of river or ground water containing large amounts of inorganic materials such as sand and clay or suspended materials; waste water such as reused sewage, sewage or the like containing organic materials at a high concentration; etc. Also, according to this invention, a stable permeation flow velocity can be easily ensured by a compact device, so that this invention is suitable as a water treatment for simple water works having a relatively small scale in which the raw water is river water or ground water.

When the membrane module of this invention is used, the size of the membrane module can be appropriately selected depending upon the amount of water to be treated. When a large amount of water is treated as in the tap water treatment, a membrane module having a module case having an outer diameter of 3 to 20 inches is usually used. In addition, the length of the membrane module is generally 0.5 to 2 m.

The hollow fiber membrane used in this invention includes so-called ultrafiltration membranes and precision filtration membranes.

The molecular weight of polymeric materials such as protein and the like which can be fractionated by a hollow fiber membrane such as ultrafiltration membrane or the like (referred to hereinafter as the fractionated molecular weight) and the average pore diameter of a hollow fiber membrane such as micro-filtration membrane or the like is varied depending upon the water-permeation capacity and filtration capacity of the membrane; however, in the case of the ultrafiltration membrane, the fractionated molecular weight is 1,000 to 200,000 daltons, preferably 6,000 to 100,000 daltons, and in the case of microfiltration membrane, the average pore diameter is 0.01 to 1 $\mu$m, preferably 0.1 to 0.5 $\mu$m.

One of the advantages of effecting the membrane filtration in the presence of ozone is that by inhibiting the clogging of the membrane resulting from organic materials, the amount of water permeated is prevented from being sharply decreased to achieve a stable filtration. In order to markedly utilize this advantage in industry, it is necessary to sufficiently consider the pore diameter of the membrane. In the conventional filtration of the raw water including river water, ground water and the like, when the pore diameter is smaller, the occurrence of clogging of membrane is lesser, and the maintenance percentage of the amount of water permeated based on the amount of water initially permeated is relatively high but the absolute amount of water permeated becomes smaller owing to the too small pore diameter. Accordingly, when the pore diameter is too small, the economical effect for treatment of a large amount of water which is the object of this invention is not substantially great though the effect of ozone on inhibiting the clogging is exerted. On the other hand, when the pore diameter is too large, the above-mentioned effect of ozone is exerted, but inorganic materials other than the organic materials contribute greatly to the clogging, and as a result, such a fear is caused that it may constitute an obstacle to the stable filtration. Moreover, since the amount of materials passing through the membrane without being filtered is increased, a membrane having a large pore diameter affects adversely the water quality after the filtration and particularly when the filtered water is used as tap water, it becomes difficult to keep the water quality satisfactory.

From the above-mentioned matters, the hollow fiber membrane of this invention is one in the region of the microfiltration membrane in which the average pore diameter is preferably 0.01 to 1 $\mu$m, more preferably 0.1 to 0.5 $\mu$m. In this case, the average pore diameter can be measured by an air flow method (ASTM: F316-86).

The size of the hollow fiber membrane is usually such that the outer diameter is 0.5 to 5 mm and the inner diameter is 0.2 to 4.5 mm, from the viewpoint of pressure loss, membrane strength and filling efficiency.

In this invention, the hollow fiber membrane is composed of a fluorine type resin in that it can withstand the strong oxidative action of ozone. Specifically, the fluorine type resin includes polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-hexafluoropropylene-perfluoroalkyl vinyl ether copolymer (EPE), tetrafluoroethylene-ethylene copolymer (ETFE), polychlorotrifluoroethylene (PCTFE), chlorotrifluoroethylene-ethylene copolymer (ECTFE), polyvinylidene fluoride (PVDF) and the like. In particular, from the viewpoint of being excellent in ozone resistance and mechanical strength as a membrane, ETFE, PCTFE and PVDF are preferred, and in addition, from the viewpoint of being excellent in moldability, PVDF is more preferable.

As other materials for the hollow fiber membrane, a ceramic membrane can be mentioned from the viewpoint of ozone resistance, but the ceramic membrane is high in cost at present and is economically undesirable.

The hollow fiber membrane in this invention can be prepared by a known method. For example, a hollow fiber membrane having a three-dimensional, reticular structure can be prepared by adopting such a method as a wet method which comprises preparing a liquid mixture of the starting resins using a solvent or the like, thereafter ejecting the liquid mixture in the hollow state from a nozzle and molding the ejected mixture with a coagulating agent or the like; a method which comprises heating a mixture of the starting resins with a solvent to form a uniform solution and thereafter cooling this solution to cause phase separation; or the like. Moreover, it is also possible to prepare a hollow fiber membrane of porous membrane by a so-called stretching method, an interface pealing method, a radiation etching or the like. Furthermore, JP-A-3-215535 discloses a method of preparing a hollow fiber membrane by a mixing extraction method, and such a method can be mentioned as a preferable method. This method consists of mixing the PVDF resin with an organic liquid or inorganic powder, thereafter melt-molding the mixture, then extracting the organic liquid or inorganic powder from the resulting molded article. In this case, as the inorganic powder, hydrophobic silica is preferably used.

As a material for the module case used in the hollow fiber membrane module of this invention, there can be mentioned generally stainless steel which is excellent in ozone resistance, for example SUS-304, SUS-304L, SUS-316, SUS-316L or the like. The stainless steel has a heavy weight, so that there is such a disadvantage that the workability relating to mounting, exchange and the like of the membrane module becomes bad, or the like. However, it has an advantage that reuse is easy, and hence, it can be mentioned as a preferable material.

In view of excellent ozone resistance, light weight and good workability, the following resins can also be mentioned as materials for the module case:

Fluorine type resins such as polytetrafluoroethylene (PTFE), tetrafluoroethylene-perfluoroalkyl vinyl ether copolymer (PFA), tetrafluoroethylene-hexafluoro-propylene copolymer (FEP), tetrafluoroethylene-hexafluoropropylene-perfluoroalkyl vinyl ether copolymer (EPE), tetrafluoroethylene-ethylene copolymer (ETFE), polychlorotrifluoroethylene (PCTFE), chlorotrifluoroethylene-ethylene copolymer (ECTFE), polyvinylidene fluoride (PVDF), polyvinyl fluoride (PVF) and the like; chlorine type resins such as polyvinyl chloride (PVC), polyvinylidene chloride (PVDC) and the like; etc.

In addition, from the viewpoint of mold-ability, low cost and the like, a module case in which the above-mentioned stainless steel is combined with the resin can be also used in the hollow fiber membrane module of this invention.

From the viewpoint of ozone resistance, mold-ability, mechanical strength and the like, the fluorine type resin to be used as the material for the module case is preferably ETFE or PVDF, more preferably PVDF, and the chlorine type resin is preferably PVC. The chlorine type resin is slightly inferior in ozone resistance to the fluorine type resin, but the module case has a thickness to a certain extent (1 mm to 10 mm) necessary for keeping its strength and the like, so that even if a slight deterioration is caused in the surface layer portion, it can be sufficiently used depending upon conditions under which the membrane is used, for example, ozone concentration, temperature and use period. PVC is generally less expensive than the expensive fluorine type resin and excellent in mechanical strength and moldability, so that it can become a preferable material for the module case of this invention. Incidentally, PVC includes rigid and soft types, and the rigid type is used in this invention.

The bonding portion of the bundle of hollow fiber membranes and the module case is required to be excellent in ozone resistance as a matter of course, and also excellent in mechanical strength after bonding, hardness, bonding strength of the bundle of hollow fiber membranes to the module case, and further excellent in processability at the time of preparation of the module. For example, when a melt-bonding method using a fluorine type resin excellent in ozone resistance is applied, there is a fear that the hollow fiber membrane and the module case are deformed because the melting point of the resin is high. Also, there are some inorganic adhesives excellent in ozone resistance, but they have such disadvantages as inferior water resistance, inferior processability and the like, so that they are difficult to use in the bonding portion in this invention.

The present inventors have sufficiently considered the conditions necessary as the adhesive and have examined the behavior and the characteristics of cured product, and have consequently found that silicone type resins are the best as the materials for the bonding portion in this invention.

In this invention, the silicone type resin includes silicone rubbers, too. The silicone type resin can be cured at low temperatures and is excellent in adhesiveness and weather resistance, so that they have heretofore been used as an adhesive or a sealing agent in the industrial field.

In this invention, as the adhesive, among silicone type resins, there are used those classified among the liquid silicone rubbers. The liquid silicone rubber is classified into condensation type and the addition type based on the curing mechanism, and in this invention, the addition type is preferred in view of easiness of control of curing reaction rate, uniformity of curing reaction, curability in deep portion, inhibition of production of by-products, dimensional stability and the like. In the case of the addition type, for example, the curing reaction rate can be freely varied by curing temperature, kind and amount of catalyst, amount of reaction inhibitor and the like.

Since the addition type does not require the presence of water such as moisture in air or the like in the curing as required by the condensation type, the curing reaction proceeds homogeneously both on the surface and in the interior, and the curability in the deep portion is good. Furthermore, in the case of the addition type, by-products are not produced such as water, alcohol, acetic acid, oxime, ketone, amine, amide, hydroxylamine and the like produced in the condensation-curing as in the case of the condensation type, and hence, the dimensional stability is good and the linear shrinkage is relatively small.

The addition type silicone rubber is obtained using the mechanism of subjecting a polysiloxane having a vinyl group and a polysiloxane having a Si—H linkage to addition-reaction to form a siloxane chain by cross-linking. The following formula (I) shows an example of said reaction formula:

As a curing catalyst for the addition type liquid silicone rubber, a platinum catalyst is used; however, if such a curing inhibitor as to deactivate this catalyst such as amine, organophosphorus compound, sulfur compound, organotin compound or the like is present, there is a fear that the curing may become insufficient, so that it is desirable to avoid the contact with these materials during the molding.

The ozone resistance is varied depending upon the molecular weight of a base polymer of the liquid silicone rubber, the content of the base polymer, the kind and content of an additive, and the like, so that it is necessary to sufficiently consider these points when selecting the liquid silicone rubber, and in addition, it is also necessary to sufficiently consider the viscosity before the curing, the mechanical characteristics after the curing and the like. As to the relation between the ozone resistance and the molecular weight of the base polymer, a higher molecular weight is preferable because the ozone resistance is better; however, when the molecular weight is too high, the viscosity before the curing becomes high, and, for example, when a module is prepared using a centrifugal bonding machine, the processability becomes bad owing to said high viscosity. Considering these points, the weight average molecular weight of the base polymer is preferably 5,000 to 300,000, more preferably 10,000 to 100,000 and most preferably 20,000 to 60,000. The weight average molecular weight is measured using a viscosity method.

On the other hand, in the case of a liquid silicone rubber having thixotropic properties, even if its molecular weight is equivalent to the above-mentioned one, the viscosity thereof is lowered in the centrifugal bonding, and hence, the processability thereof is enhanced, so that when a high molecular weight polymer is used, it is preferable for the polymer to have the said properties. The thixotropic property is also called thixotropy, and means such a rheology behavior that the viscosity is decreased by an increase of shear strength and when the shear strength is removed the original high viscosity is recovered.

When preparing a module using a centrifugal bonding machine, the viscosity before the curing is preferably 10 mPa·sec to 250 Pa·sec, more preferably 10 mPa·sec to 100 Pa·sec, from the viewpoint of moldability. The viscosity is measured according to JIS K6833 using a rotational viscometer, provided that the viscosity of a liquid silicone rubber having thixotropic properties is measured according to JIS Z8803.

The higher the cross-linking density of polymer of the liquid silicone rubber, the better the ozone resistance of the bonding portion. This cross-linking density can be controlled by varying the amount of a polyfunctional cross-linking agent added to the liquid silicone rubber.

In this invention, the adhesive can have added thereto a filler such as silica, carbon black, carbon fluoride or the like for increasing the mechanical characteristics. In this case, when the filler content is too high, the adhesiveness is deteriorated owing to a decrease of the content of the base polymer, and there is a fear of a leakage of water from the bonding portion and the like. Usually, the filler content is 5 to 80% by weight, preferably 10 to 50% by weight.

A liquid silicone rubber in which a part of the side chain of the base polymer has been fluorinated is excellent in ozone resistance and can be used as a preferable adhesive in this invention. The following formulas (2) show examples of the structural formulas thereof:

In the above formulas, each of n, m and l is the number of the repeating unit determined by the molecular weight of the base polymer mentioned above.

When the silicone resin to be used in the bonding portion is selected, in view of the mechanical strength and durability required to the hollow fiber membrane of this invention, the characteristics thereof after the curing are such that the JIS-A hardness as measured by the measurement method of JIS K6301 is at least 30, preferably at least 40, and more preferably at least 50, and the strength at break is at least 2 MPa, preferably at least 5 MPa and more preferably at least 6 MPa.

In this invention, specific examples of the adhesive include, for example, TSE322, TSE322B, TSE3221, TSE3212, TSE3253, TSE326, TSE3331, TSE3337, TSE3033, TSE3320 and TSE3315 manufactured by Toshiba Silicone Co., Ltd.; FE61, KE1202, KE1206, KE1216, KE1602, KE106, KE109, KE109E, KE1204 and KE1302 manufactured by Shin-Etsu Silicone Co., Ltd.; SE1711, SE1750, SE1701 and CY52-237 manufactured by Toray·Dow Corning·Silicone Co., Ltd.; and the like. In particular, TSE322, TSE3337, FE61 and the like are preferred because the original mechanical properties thereof are high and the deterioration of physical properties thereof due to ozone is small.

However, even when a silicone rubber having a relatively high strength as mentioned above is used, a large size module employed in industrial uses causes cohesive failure in the bonding portion and cannot withstand long term use in some cases though it depends upon the thickness of the bonding portion. Such a case can be met by making the thickness of the bonding portion so large as not to cause cohesive failure; however, as compared with an adhesive which is usually used, for example, an epoxy resin, a urethane resin or the like, the silicone rubber is very expensive, and when the amount of the silicone rubber used is increased, the production cost is elevated sharply and the number of sites which do not contribute to filtration in the longitudinal direction of the hollow fiber membrane becomes large, the amount of water obtained per membrane module becomes low, and the running cost is increased. Therefore, such a meeting method cannot be said to be desirable.

On the other hand, the present inventors have found that by providing a reinforcing rib fixed directly on the inner wall of the module case in the bonding portion of the hollow fiber membrane and the module case, the cohesive failure in the bonding portion can be prevented. According to this method, the amount of the silicone rubber used can be decreased and, in addition, the fixing of the reinforcing rib on the module case can be conducted, for example, by fixing by screwing into the inner wall of the module case, by fixing by a combination with the notch portion provided in the module case, by fusion-fixing, by weld-fixing or by molding integrally with the module case. According to such a fixing method, the reinforcing rib can be easily processed and a cost suitable to industrial uses can be obtained. Here, the fusion means melting to bond the materials of both module case and reinforcing rib together with an ultrasonic wave, heat or solvent in the state that the reinforcing rib has been inserted into the module case. Also, the weld means fixing the module case and the reinforcing rib by heat using a welding rod or the like in the state that the reinforcing rib has been inserted into the module case.

The method of receiving the hollow fiber membrane bundle into the module case includes a method which comprises fixing the reinforcing rib on the module case and thereafter receiving the hollow fiber membrane bundle into the module case and a method which comprises placing the hollow fiber membrane bundle up on at least one reinforcing rib and thereafter receiving the hollow fiber membrane bundle together with the reinforcing rib into the module case. The latter method is particularly effective when the reinforcing rib is fixed by screwing or by a combination of notches. Moreover, when the hollow fiber membrane bundle is received into the module case, a protective net made of a plastic such as ETFE, PVDF, PCTFE, PTFE, PVC or the like or a metal such as stainless steel, titanium or the like may be wound round the hollow fiber membrane bundle.

In this invention, the reinforcing rib is preferably embedded as a whole in the bonding portion.

This is because when the whole of the reinforcing rib is embedded in the bonding portion, even if the bonding strength of the bonding portion is lowered by a long term use or the like, such trouble is not caused that the bonding portion is separated away from the rein-forcing rib during the use unless the bonding portion is broken. When such a structure that the reinforcing rib projects from the cross-section of an opening of the hollow fiber membrane is taken, the blade of a cutter tends to be wounded by the reinforcing rib when, after the module has been assembled, the bonding and fixing portion is cut by the cutter to open the hollow portion of the hollow fiber membrane. In the case of such a structure that the reinforcing rib protrudes into the interior of the module, there is a fear that the hollow. fiber membrane is rubbed with the end of the reinforcing rib or the like and broken because the hollow fiber membrane swings owing to the flow of a fluid during the operation.

However, even the module in which the reinforcing rib projects from the bonding portion of the module can be used under some conditions. For example, when the reinforcing rib is made of a resin, the blade of the cutter is not wounded in most cases. When the materials of the reinforcing rib and the membrane are the same, there is a case where the membrane is not so much wounded by rubbing between the membrane and the reinforcing rib depending upon the strength of the membrane.

The material used for the reinforcing rib includes stainless steel such as SUS-304, SUS-304L, SUS-316, SUS-316L and the like; fluorine type resins such as polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-hexafluoropropylene-perfluoroalkyl vinyl ether copolymer (EPE), tetrafluoroethylene-ethylene copolymer (ETFE), polychlorotrifluoroethylene (PCTFE), chlorotrifluoroethylene-ethylene copolymer (ECTFE), polyvinylidene fluoride (PVDF) and the like; chlorine type resins such as polyvinyl chloride (PVC), polyvinylidene chloride (PVDC) and the like; etc.

Moreover, in this invention, the shape of the reinforcing rib set up in the bonding portion is preferably a radial shape, a lattice shape or a combined shape of radial and concentric shapes when it is viewed from the direction of the cut section of the hollow fiber membrane. Arranging the reinforcing rib having such a shape in the module case, fixing it thereon and further placing the reinforcing rib in the form of a flat plate parallel to the fiber axis direction of the hollow fiber membrane is preferable because, as a result, the number of membranes filled and the filling density in one bundle of the hollow fiber membranes divided by the reinforcing rib become substantially the same as those in another bundle, and it becomes possible to increase the number of membranes filled. In addition, when a plurality of perforated holes are bored in the above reinforcing rib, the bonding and fixing of the reinforcing rib and the silicone type resin are made stronger, so that it is more preferable.

Figure 1:
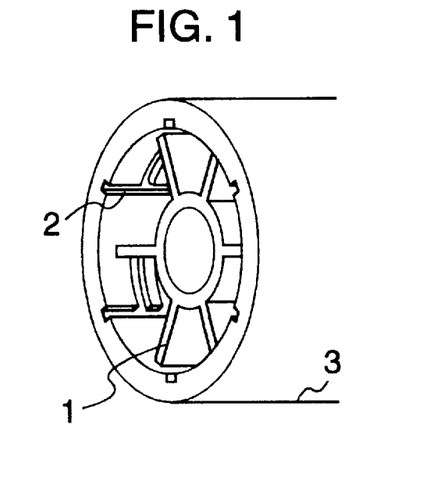
FIG. 1 is a perspective view showing an example of the reinforcing rib and module case having notch portions of this invention.
Figure 2:
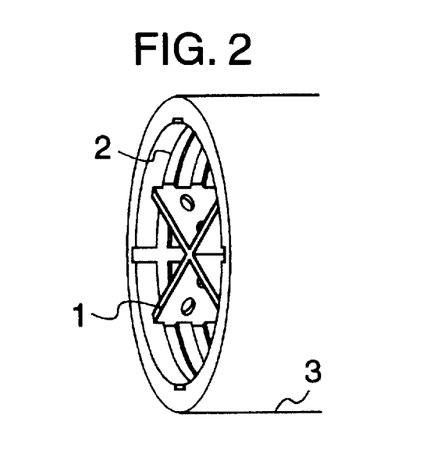
FIG. 2 is a perspective view showing an example of the reinforcing rib and module case having notch portion of this invention.

Examples of fixing by a combination of a reinforcing rib 1 with a notch portion 2 provided in the inner wall of a module case 3 are shown in FIG. 1 and FIG. 2, and examples of the sectional shapes of the reinforcing rib 1 are shown in FIG. 3 to FIG. 7.

The hollow fiber membrane module of this invention can be applied to either an internal pressure filtration system in which the raw water is fed to the hollow portion of the hollow fiber membrane and filtration is effected in the direction from the inner surface side to the outer surface side of the membrane, or an external pressure filtration system in which the raw water is fed from the outer surface of the hollow fiber membrane and filtration is effected in the direction from the outer surface to the inner surface side of the membrane. In the case of the internal pressure filtration system, the area of flow path through which the raw water flows per unit sectional area of the module becomes smaller than in the case of the external pressure filtration system, so that there is an advantage that the power necessary for keeping the same linear velocity is made smaller. However, the clogging of the opening portion of the hollow fiber membrane is caused in some cases, so that in the case where a high level pretreatment is not effected, the internal pressure filtration system is limited to a treatment of the raw water having a turbidity of not more than 5 NTU, preferably not more than 3 NTU. On the other hand, the external pressure filtration system can be applied to a treatment of the raw water having a high turbidity, too. In the membrane module in the external pressure filtration system, many hollow fiber membranes are bonded and fixed in the module case and a plurality of openings for feeding the raw water and/or a gas are provided in the bonding portion.

Sectional views of examples of the module of the external pressure filtration system of this invention are shown in FIG. 8 to FIG. 13.

Figure 16:
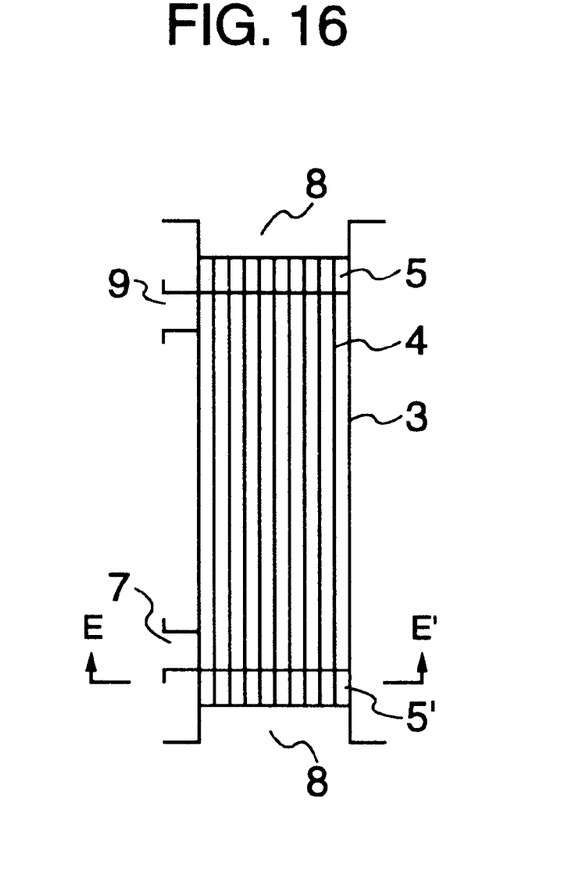
FIG. 16 is a cross-sectional view showing an example of a conventional external pressure system module.
Figure 17:
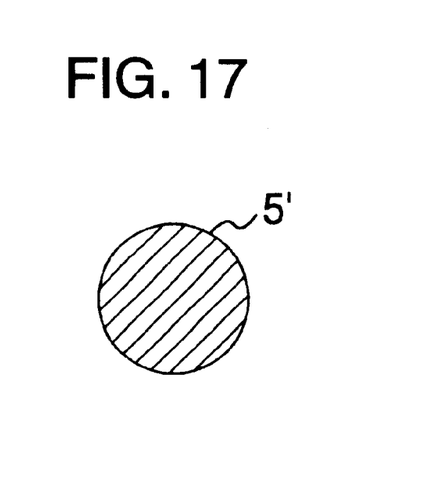
FIG. 17 is the E–E' cross-sectional view of the module of FIG. 16.

In the conventional module of the external pressure filtration system, as shown in FIGS. 16 and 17, a raw water-feeding nozzle 7 is provided perpendicularly to the longitudinal direction of a hollow fiber membrane 4, and the raw water flows from the external peripheral portion of the fiber bundle to the center and then flows in the longitudinal direction of the fiber bundle. Therefore, in the case of a large caliber module used in a treatment of a large amount of water, the diameter of the hollow fiber membrane bundle becomes large, so that a pressure loss takes place in the direction of diameter of the membrane bundle and it becomes impossible for the whole of fiber bundle to uniformly contribute to the filtration, and the amount of water filtered decreases with the lapse of time. In particular, in a module by which ozone is added to the raw water and the amount of water filtered has been sharply increased, the above influence is great. Also, even when an aeration-flushing treatment is effected for discharging the suspended materials piled on the hollow fiber membrane bundle, the conventional module structure has a low effect on the removal of suspended materials accumulated in the 180°-opposite direction to the nozzle and in the central portion of fiber bundle, and particularly when raw water having ozone added thereto is filtered, inorganic suspended materials are much attached to the membrane, so that it is necessary that the module have such a module structure that the aeration-flushing effect is high. The aeration-flushing referred to herein means such an operation as to strip off the suspended materials piled on the membrane surface and/or the suspended materials accumulated between the hollow fiber membranes by aeration and further discharge the piled materials and/or the accumulated materials by flushing out of the system, namely, out of the module or apparatus. Aeration and flushing may be effected successively or simultaneously.

The sectional shape of the opening provided in the bonding portion includes circle-shape, ellipse-shape, fan-shape, triangle-shape, tetragon-shape, hexagon-shape, slit-shape and the like. In particular, one having a circle-shaped or ellipse-shaped section is preferred because the liquid-contacting surface area per sectional area of opening becomes minimum and the pressure loss of the fluid becomes small.

Moreover, when the number of openings provided in the bonding portion is greater, the accumulation of the suspended materials in the module is hardly caused, while the number of fillable hollow fiber membranes filled in the module becomes small, and the amount of water permeated becomes small as much. The number of openings is varied depending upon the diameter of module and the shape of opening and, for example, when the module has a 3-inch diameter the number of openings is 3 to 30. When the module has a 5-inch diameter the number of openings is about 4 to 80.

The opening area percentage of the openings provided in the bonding portion is expressed by the following numerical formula (3), and it is 10 to 40%, preferably 15 to 35%:

$$K = \frac{S \times N}{R^2 \times \pi \times M} \times 100 \qquad (3)$$

wherein K is the opening area percentage, S is the sectional area of one opening, N is the number of openings, R is the outer radius of the hollow fiber membrane and M is the number of hollow fiber membranes.

Figure 14:
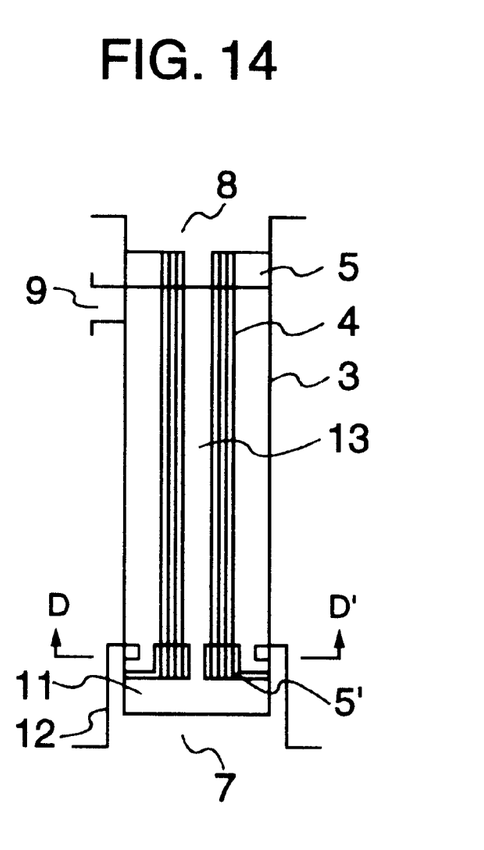
FIG. 14 is a cross-sectional view showing an example of the module of this invention.
Figure 15:
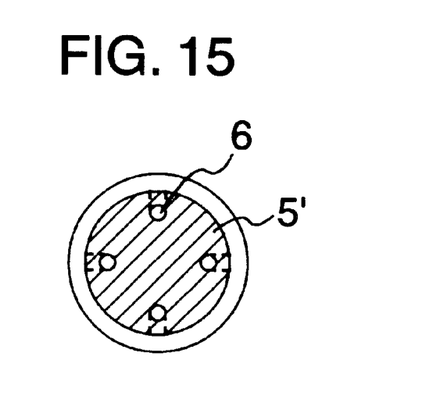
FIG. 15 is the D–D' cross-sectional view of the module of FIG. 14.

As the system of gathering filtered water, there can be used either a one end water gathering system or a both ends water gathering system. In the case of the one end water gathering system, as shown in FIGS. 8 to 13, one end of the hollow fiber membrane 4 is bonded in the state that the hollow fiber has been opened, and the other end is sealed with an adhesive. The opening for feeding raw water and/or a gas is provided in the bonding portion 5' in which the hollow fiber membrane is sealed with an adhesive. In the case of the both ends water gathering system, as shown in FIGS. 14 and 15, the hollow fiber membrane is bonded in the state that both ends have been opened, the lower end of the module has a water-gathering chamber 11 for filtered water and a skirt-shaped cover 12 surrounding the same, and a water-gathering tube 13 is provided for taking out the filtered water in the water-gathering chamber 11 to the upper end. The opening 6 provided in the lower end bonding portion is communicated with the gap between the skirt-shaped cover 12 and the module case 3 through the perforated hole on the side of the module case.

The openings 6 provided in the bonding portions 5 and 5' of this invention are preferably provided in the interior of the hollow fiber membrane bundle, whereby raw water and/or a gas fed to the module spreads uniformly over the whole of the hollow fiber membranes, and it becomes difficult for the suspended materials to pile up in the gap between the hollow fiber membranes and a stable amount of water filtered is obtained over a long period of time. When this opening is provided in the outside of the hollow fiber membrane, the raw water and/or gas fed to the module tends to cause a channeling, and as a result, there is a fear that such problems may be caused that the accumulation of the suspended materials becomes easy to cause in the interior of the hollow fiber membrane bundle, the effective membrane surface area is reduced and the amount of water permeated is decreased.

Furthermore, the openings 6 provided in the bonding portions 5 and 5' are preferably so provided that the end faces of the openings are positioned on the same face as the interface of the bonding portion in the inside of the module. The accumulation of the suspended materials in the vicinity of the interface of the bonding portion of the hollow fiber membrane is thereby inhibited and a stable amount of water filtered can be obtained over a long period of time. When this opening end face projects from the interface of the bonding portion into the inside of the module, the flow is easy to stay in the lower portion than the opening end face and the entering of the gas becomes difficult, so that the accumulation of the suspended materials in the interior of the hollow fiber membrane bundle becomes easy to cause, and as a result, there is a fear that such problems may be caused that the effective membrane area is decreased and the amount of water permeated is lowered.

Furthermore, when the mechanical strength of the hollow fiber membrane used is low, there is caused in some cases such a problem that the hollow fiber membrane is broken during the operation of filtration. During the operation, the breakage of membrane is often caused in the vicinity of the interfaces of the bonding portions at both ends of the hollow fiber membrane. In the module of this invention, too, a cylindrical rectification tube may be provided at one or both ends of the hollow fiber membrane for preventing the breakage of the hollow fiber membrane. As the material for the rectification tube, there can preferably be used stainless steel, a fluorine type resin or a chlorine type resin as in the case of the material of the module case.

The opening provided in the bonding portion is formed by, first of all, setting an opening-forming jig at the end of the hollow fiber membrane, bonding and fixing the same, together with the hollow fiber membrane, with an adhesive on the inside of the module case, when the opening-forming jig is set so that the end of it projects from the interface of the bonding portion into the inside of the module case, and after the unnecessary bonding portion end has been cut or without cutting the same, removing the opening-forming jig remaining in the bonding portion.

As the opening-forming jig, there may be used any material which cannot be impregnated with an adhesive, is good in peelability and is resistant to the temperature at which the bonding is effected. For example, paper; a resin such as polyethylene, polypropylene, polyester, fluorine type resin, chlorine type resin, rubber or the like; a metal such as stainless steel, aluminum or the like coated with a fluoroplastic excellent in peelability; and the like are used. The jig may or may not be hollow as long as the outer shape of the jig is the same as the shape of the opening; however, a hollow jig is preferable because the operation is easy at the time of cutting or removal.

The module of this invention includes not only a rack type which is connected to the piping and used but also a cartridge type module which is received into a contour casing or a tank and used.

Figure 8:
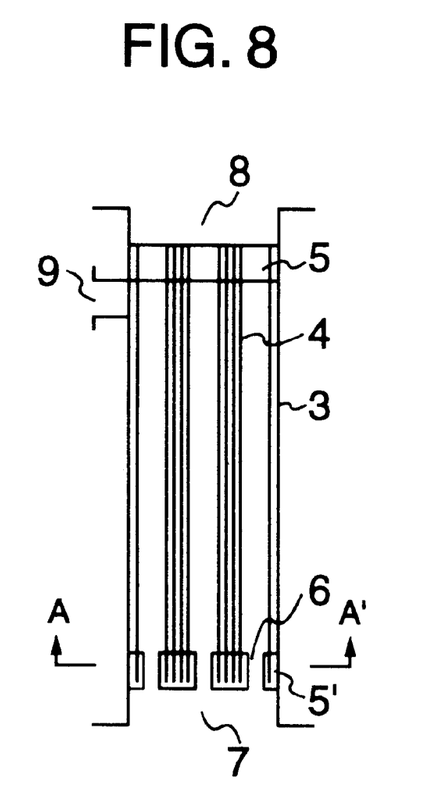
FIG. 8 is a cross-sectional view showing an example of the module of this invention.
Figure 10:
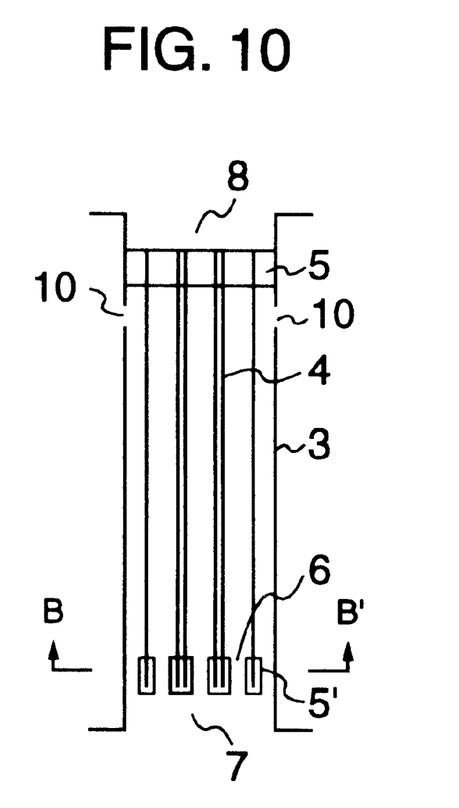
FIG. 10 is a cross-sectional view showing an example of the module of this invention.
Figure 11:
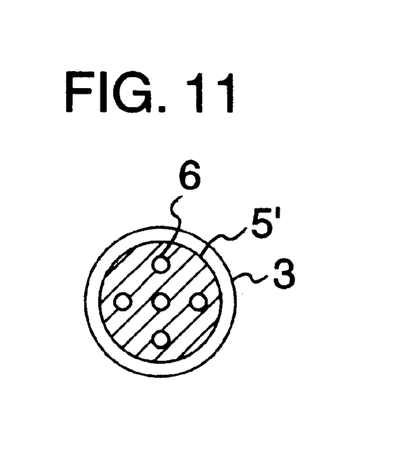
FIG. 11 is the B–B' cross-sectional view of the module of FIG. 10.
Figure 12:
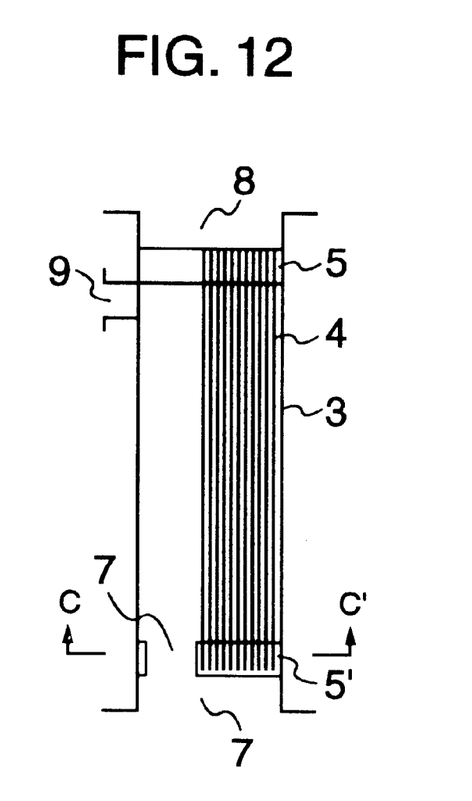
FIG. 12 is a cross-sectional view showing an example of the module of this invention.
Figure 13:
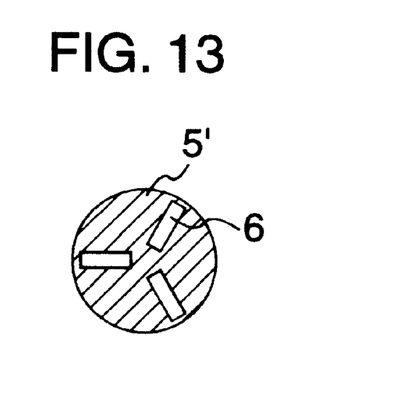
FIG. 13 is the C–C' cross-sectional view of the module of FIG. 12.

A method of the standard operation of the module of this invention is explained below referring to FIG. 8 and FIG. 10.

First of all, in the filtration operation mode, raw water containing ozone which is the water to be treated is fed from a raw water-feeding nozzle 7. The raw water passes through a bonding portion opening 6 provided in a bonding portion 5', and the suspended materials in the raw water are caught on the outer surface of a hollow fiber membrane 4, and the filtered water passes through the hollow portion of the hollow fiber membrane and is gathered from a filtered water-gathering nozzle 8 in the upper part. On the other hand, the circulation-concentrated water which has been concentrated by the hollow fiber membrane is discharged from a circulation-concentrated water-discharging nozzle 9 or an outlet 10.

Next, in the back wash operation mode, the filtered water is used as a back wash water and the back wash water is fed from the filtered water-gathering nozzle 8, filtered in the direction of from the inner surface side of the hollow fiber membrane to the outer surface side, and the back wash water is discharged from the circulation-concentrated water-discharging nozzle 9 or the outlet 10, and/or from the raw water-feeding nozzle 7 after passing through the bonding portion opening 6.

Further, in an aeration-flushing mode, a gas in such an amount that the gas is hardly dissolved in the raw water, for example, air at a volumetric flow rate of 50 to 200% based on the amount of the raw water fed, is mixed with the raw water by a compressor or the like, to prepare a gas-liquid multiphase flow, and this is fed from the bonding portion opening 6 through the raw water-feeding nozzle 7, and the washing drain is discharged from the circulation-concentrated water-discharging nozzle 9 or the outlet 10.

By appropriately repeating the above-mentioned operation modes using the membrane module of this invention, the raw water becomes a flow parallel to the hollow fiber membrane and uniform over the whole of the fiber bundle and can exert more remarkably the effect of the external pressure system cross flow method. In addition, it becomes easy to discharge the suspended materials accumulated on the outer surface of membrane and in the gap between the membranes out of the module by back wash or aeration-flushing; the amount of water permeated is prevented from being decreased with the lapse of time; a stable filtration over a long period of time can be achieved without damaging the bonding portion.

EXAMPLE 1 (This Invention)

As a hollow fiber membrane, there were prepared six bundles each prepared by bundling 350 PVDF membranes prepared by the method disclosed in JP-A-3-215535, said PVDF membrane having an outer diameter of 2 mm, an inner diameter of 1 mm, a volume porosity of 66%, a ratio between the average pore diameter of the outer surface and the average pore diameter of the cross-section both determined from the average pore diameters of outer surface, inner surface and cross-section calculated by an electron photomicrograph of 1.75, a ratio between the average pore diameter of the inner surface and the average pore diameter of the cross-section both determined in the same manner as above of 0.85, an average pore diameter of 0.25 $\mu$m as measured by an air flow method, the maximum pore diameter of 0.35 $\mu$m as measured by a bubble point method, a ratio between the maximum pore diameter and the average pore diameter of 1.4, a water-permeation rate of 2,400 liters/m$^2$·hour·100 kPa (25° C.), a strength at break of 15 MPa and an elongation at break of 280%.

Figure 3:
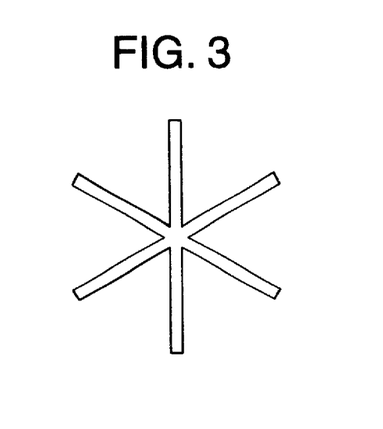

Subsequently, an inside screw processing was applied to the one end portion of a module case made of a stainless steel having an outer diameter of 140 mm and a length of 1,100 mm. Moreover, an outside screw processing was applied to the side surface of a reinforcing rib made of a stainless steel as shown in FIG. 3, and the reinforcing rib was fixed by screwing on the above module case.

Each of the above six hollow fiber membrane bundles was received into each of the 6 spaces separated by the reinforcing rib in the module case, bonding jigs were attached to both side ends and the hollow fiber membrane was bonded to and fixed on the module case on which the reinforcing rib was fixed, with an addition type silicone rubber (TSE322 manufactured by Toshiba Silicone Co., Ltd.). Furthermore, in the side end portion on which no reinforcing rib was set up, 19 tubings made of a high density polyethylene having an outer diameter of 10 mm and a length of 55 mm were arranged so that they were uniformly distributed in the hollow fiber membrane bundle, and then bonded.

After the silicone bonded portion had been sufficiently cured, the hollow fiber membrane bundles were cut for opening the hollow portion on the side on which the reinforcing ribs were set up (the filtered water-gathering side) and for removing the 19 tubings from the other side. By removing the 19 tubings, 19 openings for feeding a raw water were formed in the bonding portion to complete the preparation of a hollow fiber membrane module of this invention as shown in FIG. 8. In this case, the reinforcing rib did not project from the bonding portion end and was completely embedded therein.

The hollow fiber membrane module prepared as mentioned above was treated with ethanol to be made hydrophilic and thereafter the ethanol in the membrane was replaced with pure water.

The hollow fiber membrane module after the replacement with water was connected to an evaluator, and a raw water-feeding nozzle and a circulation-concentrated water-discharging nozzle were connected to the piping of the apparatus, and in the state that the filtered water-gathering nozzle was not fitted with a pipe joint, filtration under pressure was conducted with pure water having a water temperature of 26° C. at a feeding pressure of 500 kPa. The state of deformation of the bonding portion was checked by a strain gauge to find an about 1-mm blister at the center of each of the 6 sites separated by the reinforcing rib. In the vicinity of the portion in which the reinforcing rib was embedded, no blister was observed.

Subsequently, piping was connected to the filtered water-gathering nozzle and filtration and back wash were repeated 30,000 times using river water having a turbidity of 3 to 12 as raw water at a feeding pressure of 300 kPa at a back wash pressure of 450 kPa. In this case, an ozone gas was added to the raw water so that the ozone concentration in the filtered water became 0.3 ppm and further aeration-flushing was conducted every 1,000 cycles. After completion of the above repeating test, the bonding portion was observed to find that no deformation of the bonding portion was caused, and no crack of the bonding portion was observed. In addition, by a gastight test, leakage was checked but no leak from the bonding portion was observed. Incidentally, the gastight test was conducted by a method which comprises immersing the module in water, applying an air pressure of ½ of the bubble point of the membrane and checking a leak of air from the bonding portion.

EXAMPLE 2 (This Invention)

As a hollow fiber membrane, there were prepared four bundles each prepared by bundling 400 PVDF membranes prepared by the method disclosed in JP-A-3-215535, said PVDF membrane having an outer diameter of 1.3 mm, an inner diameter of 0.7 mm, a volume porosity of 68%, a ratio between the average pore diameter of the outer surface and the average pore diameter of the cross-section both determined from the average pore diameters of outer surface, inner surface and cross-section calculated by an electron photomicrograph of 1.75, a ratio between the average pore diameter of the inner surface and the average pore diameter of the cross-section both determined in the same manner as above of 0.85, an average pore diameter of 0.25 $\mu$m as measured by an air flow method, the maximum pore diameter of 0.35 $\mu$m as measured by a bubble point method, a ratio between the maximum pore diameter and the average pore diameter of 1.4, a water-permeation rate of 2,400 liters/m$^2$·hour·100 kPa (25° C.), a strength at break of 17 MPa and an elongation at break of 240%.

Figure 5:
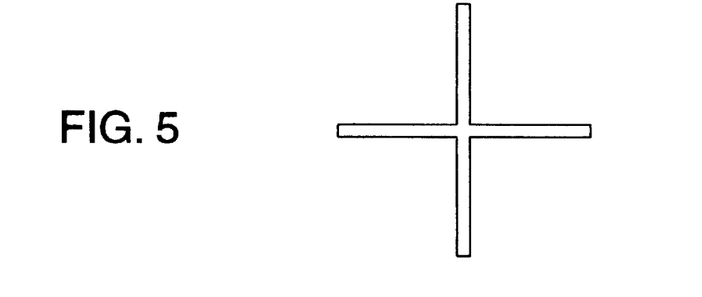
Figure 6:
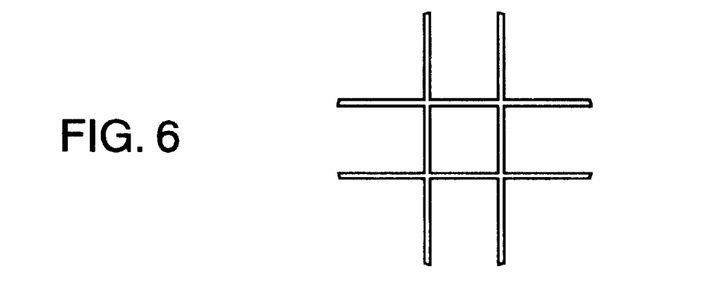
Figure 7:
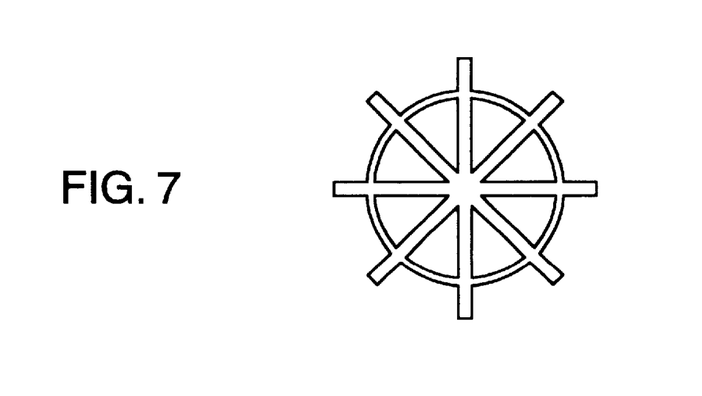

Subsequently, a PVDF reinforcing rib as shown in FIG. 5 was set up in the one end portion of a module case made of a PVDF having an outer diameter of 89 mm and a length of 1,100 mm and weld-fixed thereon.

Each of the above four hollow fiber membrane bundles was received into each of the four spaces separated by the reinforcing rib in the module case, bonding jigs were attached to both side ends, and the hollow fiber membrane was bonded to and fixed on the module case on which reinforcing rib was fixed, with an addition type silicone rubber (TSE3337 manufactured by Toshiba Silicone Co. Ltd.). Furthermore, as a bonding jig attached to the side end portion on which no reinforcing rib was set up, there was used an aluminum disk fitted at 5 places with aluminum columns having an outer diameter of 10 mm and a length of 45 mm, the surface of which was coated with a Teflon.

Figure 9:
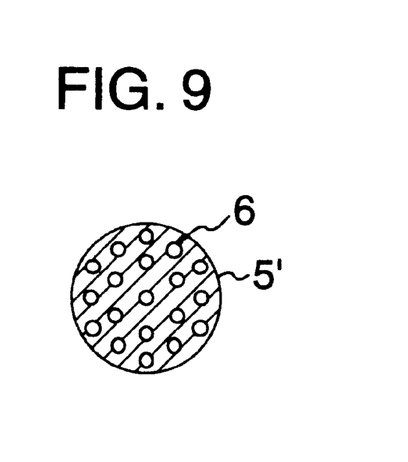
FIG. 9 is the A–A' cross-sectional view of the module of FIG. 8.

After the silicone bonded portion had been sufficiently cured, on the side on which the reinforcing rib was set up (the filtered water-gathering side), the hollow portion was cut to form openings and, on the other side, the bonding jig was removed and 5 openings were formed in the bonding portion, thereby completing the preparation of a cartridge type hollow fiber membrane module of this invention as shown in FIG. 9. In this case, the reinforcing rib did not project from the bonding portion end and was completely embedded therein.

The hollow fiber membrane module prepared as mentioned above was received into a tank made of stainless steel and then treated with ethanol to be made hydrophilic, after which the ethanol in the membrane was replaced with pure water.

After the replacement with water, a raw water-feeding tube was connected to the lower part of the tank and a concentrated water-discharging tube was connected to the upper part of the tank. In the state that no pipe was connected to the filtered water-gathering side, filtration under pressure was conducted with pure water having a water temperature of 25° C. at a feeding pressure of 500 kPa. The state of deformation of the bonding portion was checked by a strain gauge. However, no deformation was observed anywhere at the center of each of the 4 sites separated by the reinforcing rib and in the portion in which the reinforcing rib was embedded.

Subsequently, piping was connected to the filtered water-gathering nozzle and filtration and back wash were repeated 40,000 times using river water having a turbidity of 3 to 12 as raw water at a feeding pressure of 300 kPa at a back wash pressure of 450 kPa. In this case, an ozone gas was added to the raw water so that the ozone concentration in the filtered water became 0.3 ppm and further aeration-flushing was conducted every 1,000 cycles. After completion of the above repeating test, the bonding portion was observed to find no particular change. In addition, by a gas-tight test, leakage was checked but no leak from the bonding portion was observed. Incidentally, the gastight test was conducted by a method which comprises immersing the module in water, applying an air pressure of ½ of the bubble point of the membrane and checking a leak of air from the bonding portion.

EXAMPLE 3 (This Invention)

Seven bundles each prepared by bundling 300 hollow fiber membranes identical with those used in Example 1 were prepared.

Figure 4:
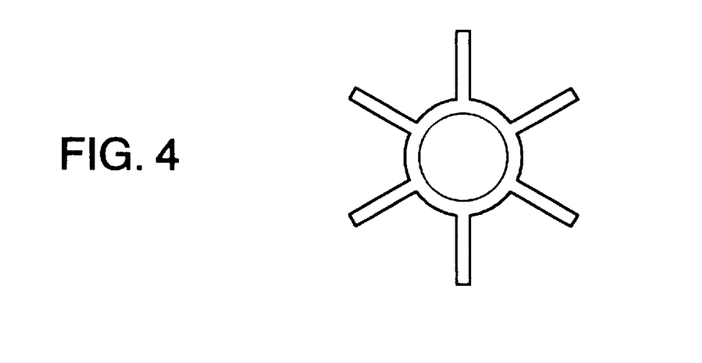

Subsequently, notches as shown in FIG. 1 were provided in the inner walls of the end portions of both sides of a module case made of PVC having an outer diameter of 140 mm and a length of 1,100 mm. Moreover, onto the outer periphery of a rib made of stainless steel having a cross-sectional view as shown in FIG. 4 was applied a notch processing corresponding to the notches on the inner periphery of the above module case. The end portion of one side of the module case was fitted with a reinforcing rib as shown in FIG. 4 which had previously been notched and subsequently, in the state that the above seven membrane bundles were received into the seven spaces of the reinforcing rib as shown in FIG. 4, the reinforcing rib was received into the module case from the other side end portion, and the notches were fitted so that the rib was not removed from the module case. The two side end portions were installed with bonding jigs, and the hollow fiber membrane, the reinforcing rib and the module case were bonded and fixed with an addition type silicone rubber (FE-61 manufactured by Shin-Etsu Silicone Co., Ltd.).

After the bonding portion was sufficiently cured, the hollow portion of the hollow fiber membrane on both sides was cut to form openings and the end portions of both side of the membrane module were installed with caps.

The hollow fiber membrane module prepared as mentioned above was treated with ethanol to be made hydrophilic, and then, the ethanol in the membrane was replaced with pure water.

After the replacement with water, the hollow membrane module was set in an evaluator, and filtration and back wash were repeated 30,000 times by an internal pressure system using river water having a turbidity of 1 to 3 as raw water at a feeding pressure of 300 kPa at a back wash pressure of 500 kPa. In this case, an ozone gas was added to the raw water so that the ozone concentration in the filtered water became 0.4 ppm.

After completion of the above repeating test, the bonding portion was observed. However, deformation of the bonding portion was not caused, nor cracking of the bonding portion was observed.

Moreover, a gastight test of the above module was conducted and leakage was observed; however, no leak from the bonding portion was observed. Incidentally, the gastight test was conducted by immersing the module in water, applying an air pressure of ½ of the bubble point of the membrane and checking a leak of air from the bonding portion.

EXAMPLE 4 (Comparison)

Under the same conditions as in Example 1, except that the module case was not fitted with the reinforcing rib, a hollow fiber membrane module was prepared.

The above hollow fiber membrane module was treated with ethanol to be made hydrophilic, and thereafter, the ethanol in the membrane was replaced with pure water.

After the replacement with water, the hollow fiber membrane module was connected to an evaluator and the raw water-feeding nozzle and the circulation-concentrated water-discharging nozzle were connected to the piping of the apparatus, after which filtration under pressure was conducted with pure water having a water temperature of 26° C. at a feeding pressure of 500 kPa in the state that the filtered water-gathering nozzle was not fitted with a pipe joint. By a strain gauge, the state of deformation of the bonding portion was checked to find that about 6-mm blister was observed in the center portion.

Subsequently, a pipe was connected to the filtered water-gathering nozzle and filtration and back wash were repeated 30,000 times using river water having a turbidity of 3 to 12 as raw water at a feeding pressure of 300 kPa at a back wash pressure of 450 kPa. In this case, an ozone gas was added to the raw water so that the ozone concentration in the filtered water became 0.3 ppm, and further aeration-flushing was conducted every 1,000 cycles. After completion of the above repeating test, the bonding portion was observed to find that in the center portion of the bonding portion, cohesive failure was caused in the state that a part containing the hollow fiber membrane bundle rose. In addition, it was confirmed that from the failure portion, three cracks started in the bonding portion.

EXAMPLE 5 (Comparison)

Under the same conditions as in Example 2, except that the module case was not fitted with a reinforcing rib, a hollow fiber membrane module was prepared.

The above hollow fiber membrane module was treated with ethanol to be made hydrophilic, and the ethanol in the membrane was replaced with pure water.

After the replacement with water, the lower part of the tank was fitted with a raw water-feeding pipe and the upper part of the side surface of the tank was fitted with a concentrated water-discharging tube, and in the state that the filtered water-gathering side was not fitted with a piping, filtration under pressure was conducted with pure water having a water temperature of 25° C. at a feeding pressure of 500 kPa. By a strain gauge, the state of deformation of the bonding portion was checked to observe about 3-mm blister in the center portion.

Subsequently, piping was connected to the filtered water gathering nozzle and filtration and back wash were repeated 40,000 times using river water having a turbidity of 3 to 12 as raw water at a feeding pressure of 300 kPa at a back wash pressure of 450 kPa. In this case, an ozone gas was added to the raw water so that the ozone concentration in the filtered water became 0.3 ppm, and further aeration-flushing was conducted every 1,000 cycles. After completion of the above repeating test, the bonding portion was observed to find that a part of the bonding portion (about half of the total periphery) was gone from the module case.

EXAMPLE 6 (Comparison)

Under the same conditions as in Example 3, except that the module case was not fitted with a reinforcing rib, a hollow fiber membrane module was prepared.

After the above hollow fiber membrane module was treated with ethanol to be made hydrophilic, the ethanol in the membrane was replaced with pure water.

After the replacement with water, the hollow fiber membrane module was set in an evaluator, and filtration and back wash were repeated 30,000 times by an internal pressure system using river water having a turbidity of 1 to 3 as raw water at feeding pressure of 300 kPa at a back wash pressure of 500 kPa. In this case, an ozone gas was added to the raw water so that the ozone concentration in the filtered water became 0.4 ppm.

After completion of the above repeating test, the module was removed from the evaluator, and the bonding portion was observed to find that cohesive failure was caused over ⅔ periphery in the peripheral portion of the bonding portion (the portion about 10 mm distant from the wall surface of the module case).

INDUSTRIAL APPLICABILITY

The hollow fiber membrane module of this invention makes possible the membrane filtration treatment of water containing ozone over a long period of time and the repeating washing (including back wash) with water containing ozone, so that its effect given the water-treating field using ozone, particularly the water works field and the like is very great.

What is claimed is:

1. A hollow fiber membrane module comprising:
   a module case;
   a hollow fiber membrane bundle comprising a plurality of hollow fiber membranes;
   a bonding portion for fixing and bonding at least one end of the hollow fiber membrane bundle to the module case, the bonding portion comprising a silicone resin;
   a reinforcing rib completely embedded in the bonding portion for reinforcing the bonding portion, said reinforcing rib being directly fixed to the module case;
   a female thread located inside of said module case; and
   a male thread located on said reinforcing rib, said male thread being engageable with said female thread to secure said reinforcing rib to said module case.

2. A hollow fiber membrane module comprising:
   a module case;
   a hollow fiber membrane bundle comprising a plurality of hollow fiber membranes;
   a bonding portion for fixing and bonding at least one end of the hollow fiber membrane bundle to the module case, the bonding portion comprising a silicone resin;
   a reinforcing rib completely embedded in the bonding portion for reinforcing the bonding portion, said reinforcing rib being directly fixed to the module case;
   a notch located inside of said module case; and
   a projection located on said reinforcing rib, said projection being insertable into said notch to secure said reinforcing rib to said module case.

3. A hollow fiber membrane module comprising:
   a module case;
   a hollow fiber membrane bundle comprising a plurality of hollow fiber membranes;
   a bonding portion for fixing and bonding at least one end of the hollow fiber membrane bundle to the module case, the bonding portion comprising a silicone resin; and
   a reinforcing rib completely embedded in the bonding portion for reinforcing the bonding portion, said reinforcing rib being directly fixed to the module case,
   wherein said reinforcing rib is fixed to said module case by welding, and said module case and said reinforcing rib are composed of stainless steel.

4. The hollow fiber membrane module according to claim 3, wherein the cross-section of the reinforcing rib perpendicular to the longitudinal direction of the hollow fiber membrane module has a radial shape, a lattice shape or a combined shape of a radial shape and a concentric shape.

5. The hollow fiber membrane module according to claim 3, wherein the reinforcing rib is a flat plate or a plurality of flat plates arranged in parallel to the longitudinal direction of the hollow fiber membrane module, said flat plate or plates having a plurality of perforated holes therein.

6. The hollow fiber membrane module according to claim 3, wherein the hollow fiber membrane comprises a fluorine resin.

7. The hollow fiber membrane module according to claim 3, wherein the bonding portion of the hollow fiber membrane bundle and the module case comprises a silicone resin obtained by curing a liquid silicone rubber.

8. The hollow fiber membrane module according to claim 3, wherein the bonding portion of the hollow fiber membrane and the module case is a silicone resin obtained by curing an addition liquid silicone rubber, the viscosity before the curing is 10 mPa·sec to 250 Pa·sec, and the weight average molecular weight before the curing is in the range of from 5,000 to 300,000.

9. The hollow fiber membrane module according to claim 3, wherein the bonding portion of the hollow fiber membrane and the module case is a silicone resin obtained by curing an addition silicon rubber and the JIS-A hardness as measured by the measurement method of JIS K6301 after the curing is at least 30, and the tensile strength at break is at least 2 MPa.

10. A hollow fiber membrane module comprising:

a module case;

a hollow fiber membrane bundle comprising a plurality of hollow fiber membranes;

a bonding portion for fixing and bonding at least one end of the hollow fiber membrane bundle to the module case, the bonding portion comprising a silicone resin; and a reinforcing rib completely embedded in the bonding portion for reinforcing the bonding portion, said reinforcing rib being directly fixed to the module case, wherein said reinforcing rib is integrally molded with said module case.

11. The hollow fiber membrane module according to claim 10, wherein the cross-section of the reinforcing rib perpendicular to the longitudinal direction of the hollow fiber membrane module has a radial shape, a lattice shape or a combined shape of a radial shape and a concentric shape.

12. The hollow fiber membrane module according to claim 10, wherein the reinforcing rib is a flat plate or a plurality of flat plates arranged in parallel to the longitudinal direction of the hollow fiber membrane module, said flat plate or plates having a plurality of perforated holes therein.

13. The hollow fiber membrane module according to claim 10, wherein the module case and the reinforcing rib are composed of any one of stainless steel, a fluorine resin and a chlorine resin or a combination thereof.

14. The hollow fiber membrane module according to claim 10, wherein the hollow fiber membrane comprises a fluorine resin.

15. The hollow fiber membrane module according to claim 10, wherein the bonding portion of the hollow fiber membrane bundle and the module case comprises a silicone resin obtained by curing a liquid silicone rubber.

16. The hollow fiber membrane module according to claim 10, wherein the bonding portion of the hollow fiber membrane and the module case is a silicone resin obtained by curing an addition liquid silicone rubber, the viscosity before the curing is 10 mPa·sec to 250 Pa·sec, and the weight average molecular weight before the curing is in the range of from 5,000 to 300,000.

17. The hollow fiber membrane module according to claim 10, wherein the bonding portion of the hollow fiber membrane and the module case is a silicone resin obtained by curing an addition silicon rubber and the JIS-A hardness as measured by the measurement method of JIS K6301 after the curing is at least 30, and the tensile strength at break is at least 2 MPa.

* * * * *

UNITED STATES PATENT AND TRADEMARK OFFICE
CERTIFICATE OF CORRECTION

PATENT NO. : 6,331,248 B1
DATED : December 18, 2001
INVENTOR(S) : Tohru Taniguchi et al.

It is certified that error appears in the above-identified patent and that said Letters Patent is hereby corrected as shown below:

<u>Title page,</u>
Item [86], please insert as follows:
-- [86]  PCT No.:      PCT/JP96/02699
         § 371 Date:   Mar. 20, 1998
         § 102(e) Date: Mar. 20, 1998 --.

Signed and Sealed this

Third Day of September, 2002

*Attest:*

*Attesting Officer*

JAMES E. ROGAN
*Director of the United States Patent and Trademark Office*